(12) United States Patent
Fujiwara

(10) Patent No.: US 11,988,840 B2
(45) Date of Patent: May 21, 2024

(54) WEARABLE IMAGE DISPLAY DEVICE

(71) Applicant: SEIKO EPSON CORPORATION, Tokyo (JP)

(72) Inventor: Takehiro Fujiwara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/706,551

(22) Filed: Mar. 28, 2022

(65) Prior Publication Data

US 2022/0317460 A1    Oct. 6, 2022

(30) Foreign Application Priority Data

Mar. 30, 2021  (JP) ................................ 2021-056472

(51) Int. Cl.
G02B 27/01    (2006.01)

(52) U.S. Cl.
CPC .. *G02B 27/0176* (2013.01); *G02B 2027/0163* (2013.01)

(58) Field of Classification Search
CPC ............................................ G02B 2027/0163
See application file for complete search history.

(56) References Cited

U.S. PATENT DOCUMENTS

| | | | | |
|---|---|---|---|---|
| 10,506,361 B1* | 12/2019 | Pallamsetty | ............. | H04R 5/02 |
| 11,852,834 B1* | 12/2023 | Wang | ................. | G02B 27/0179 |
| 2004/0008158 A1* | 1/2004 | Chi | .................... | G02B 27/0176 345/8 |
| 2014/0006026 A1* | 1/2014 | Lamb | ..................... | G10L 17/00 704/E17.001 |
| 2015/0304790 A1* | 10/2015 | Yamashita | .............. | G06F 3/167 381/303 |
| 2017/0052512 A1 | 2/2017 | Mizunuma et al. | | |
| 2019/0227329 A1* | 7/2019 | Han | .................. | G02B 27/0179 |
| 2019/0265654 A1* | 8/2019 | Mizunuma | ............. | G04G 21/04 |
| 2019/0387299 A1* | 12/2019 | Evans | ................. | G06F 3/04815 |
| 2020/0077043 A1* | 3/2020 | Kim | ...................... | G06F 1/1688 |
| 2021/0034725 A1* | 2/2021 | Donley | .................. | H04R 1/406 |
| 2021/0149620 A1* | 5/2021 | Chen | ...................... | H04R 1/323 |
| 2021/0297805 A1* | 9/2021 | Nitta | ....................... | H04S 7/304 |
| 2022/0353361 A1* | 11/2022 | Kim | .................... | H04M 1/0216 |

FOREIGN PATENT DOCUMENTS

JP    H0591582    4/1993

* cited by examiner

*Primary Examiner* — William Boddie
*Assistant Examiner* — Bipin Gyawali
(74) *Attorney, Agent, or Firm* — JCIPRNET

(57) ABSTRACT

A wearable image display device includes: a wearing member worn on a head of a user; a supporting member configured to support a display device that displays video; a coupling member that is coupled to the wearing member and the supporting member and that is configured to move the display device and the like from a first position enabling the user to visually recognize the video to a second position; and a control device configured to control an output of sound output from a speaker disposed at the supporting member. The control device makes the sound output from the speaker when the display device and the like are located in the second position louder than the sound output from the speaker when the display device and the like are located in the first position.

8 Claims, 7 Drawing Sheets

WEARABLE IMAGE DISPLAY DEVICE

The present application is based on, and claims priority from JP Application Serial Number 2021-056472, filed Mar. 30, 2021, the disclosure of which is hereby incorporated by reference herein in its entirety.

BACKGROUND

1. Technical Field

The present disclosure relates to a wearable image display device, such as a head-mounted display, that is mounted on a head and that displays images, for example.

2. Related Art

For head-mounted video display devices, for example, a worn-on-hair headphone having a flip-up structure is known in which the visual device part (display part) in front of the eye can be flipped up, when not in use, to secure a field of view in front of the user (JP-A-5-91582). In the case of such a video display device as described above, the video is not viewable when the display part is flipped up, so it is conceivable to turn off the video display in the display part to reduce power consumption.

For example, in a structure in which a built-in speaker or the like capable of outputting sound is provided in the display part, there are times when it is desired that the use of the display part be continued for sound purposes even when the display part is flipped up. However, with the flip-up of the display part, the speaker or the like is separated from the face of the user, bringing the speaker or the like farther from the user. This can make sound difficult to hear, for example.

SUMMARY

A wearable image display device according to one aspect of the present disclosure includes: a wearing member worn on a head of a user, a display device configured to display video, a supporting member configured to support the display device, a coupling member that is coupled to the wearing member and the supporting member and that is configured to move the display device from a first position enabling the user to visually recognize the video to a second position different from the first position, a sound output device disposed at the supporting member, and a control device configured to control an output of sound output from the sound output device, wherein the control device makes the sound output from the sound output device when the display device is located in the second position louder than the sound output from the sound output device when the display device is located in the first position.

DESCRIPTION OF EXEMPLARY EMBODIMENTS

First Embodiment

Hereinafter, the structure and the like of an image display device as an example of a wearable image display device according to the present disclosure will be described with reference to FIG. 1 and the like.

Figure 1:
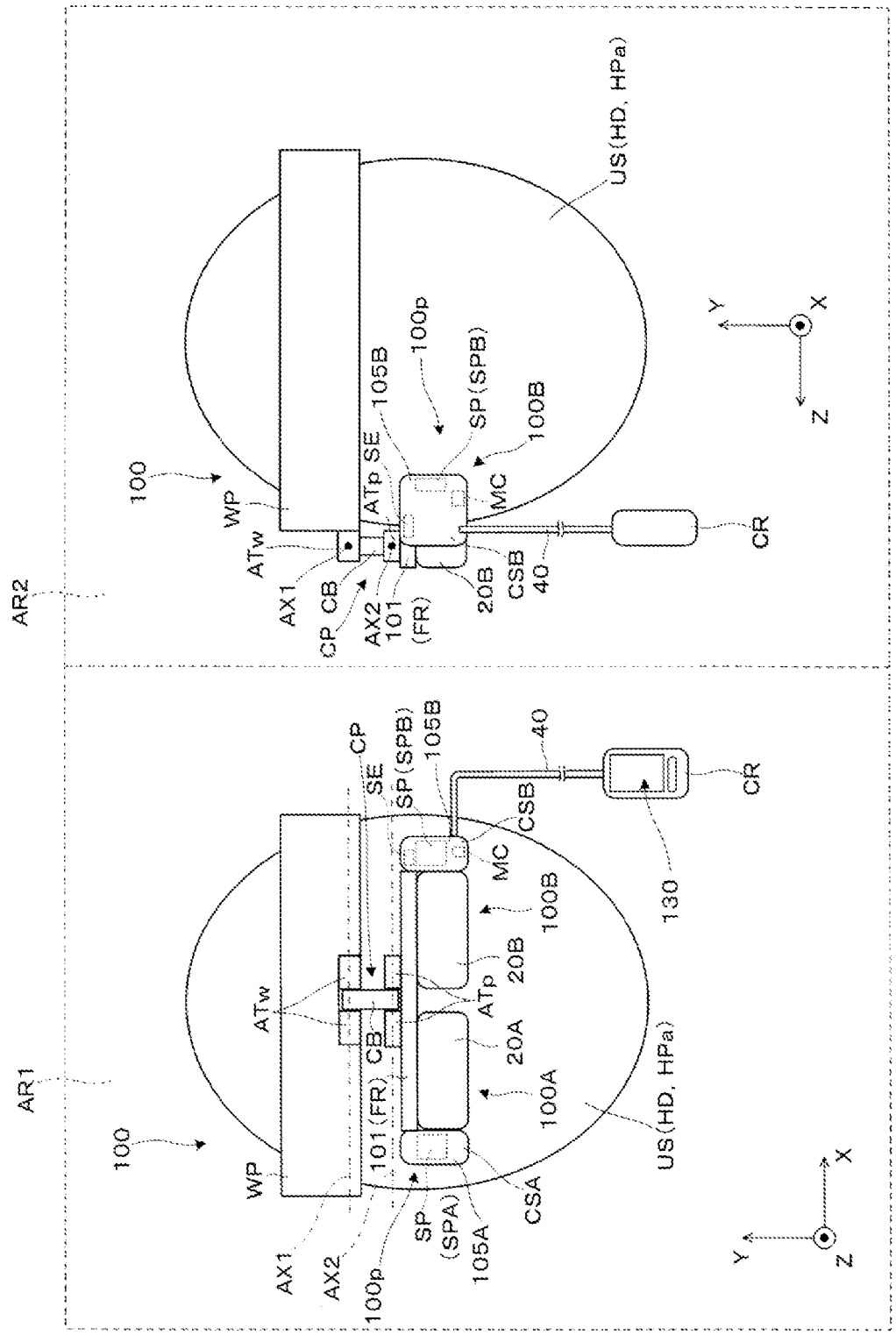
FIG. 1 is a conceptual view illustrating an example of a wearable image display device according to a first embodiment.
Figure 2:
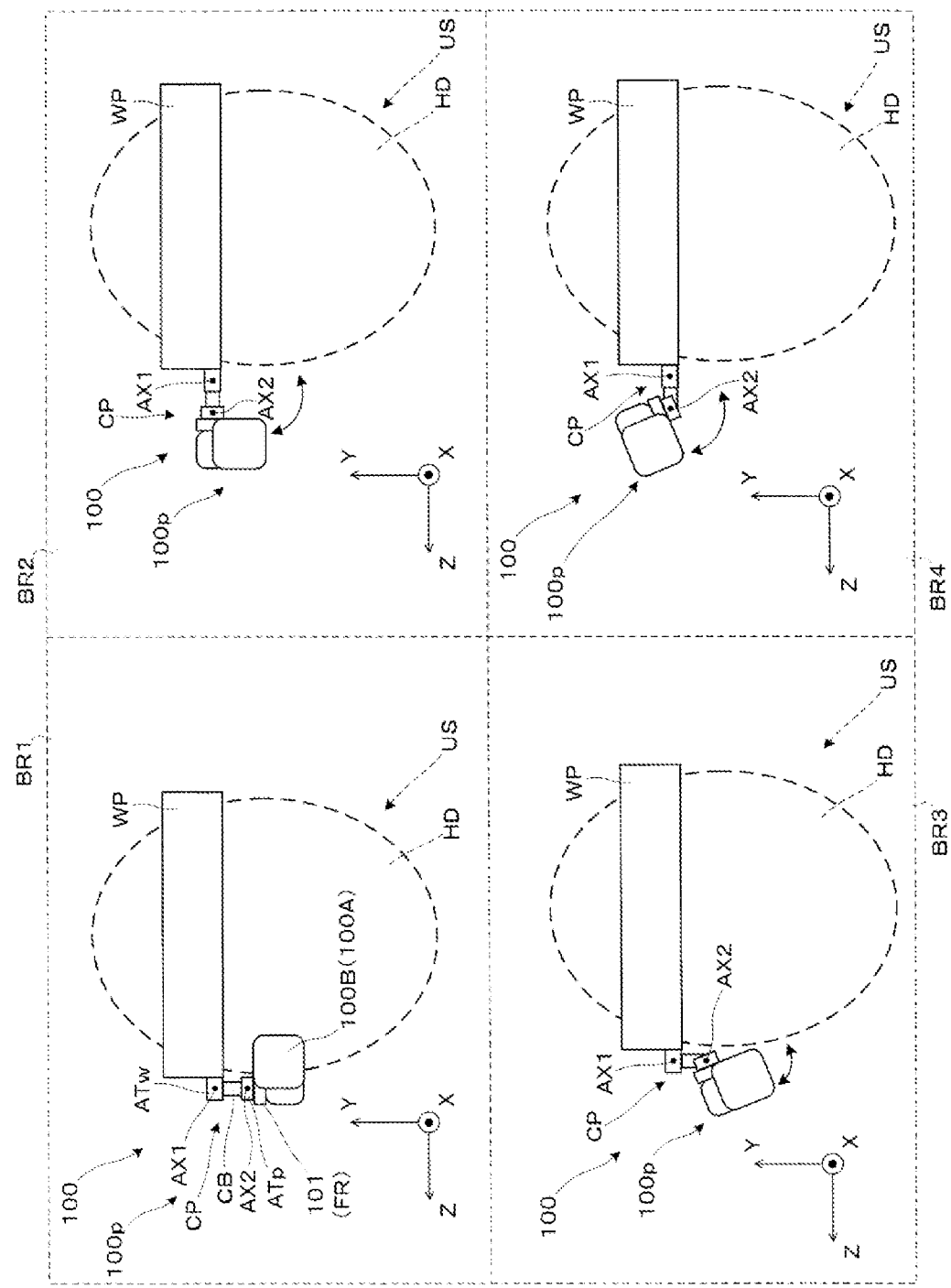
FIG. 2 is a conceptual side view illustrating a manner of changes in position (changes in posture) of a main body portion in a wearable image display device.
Figure 3:
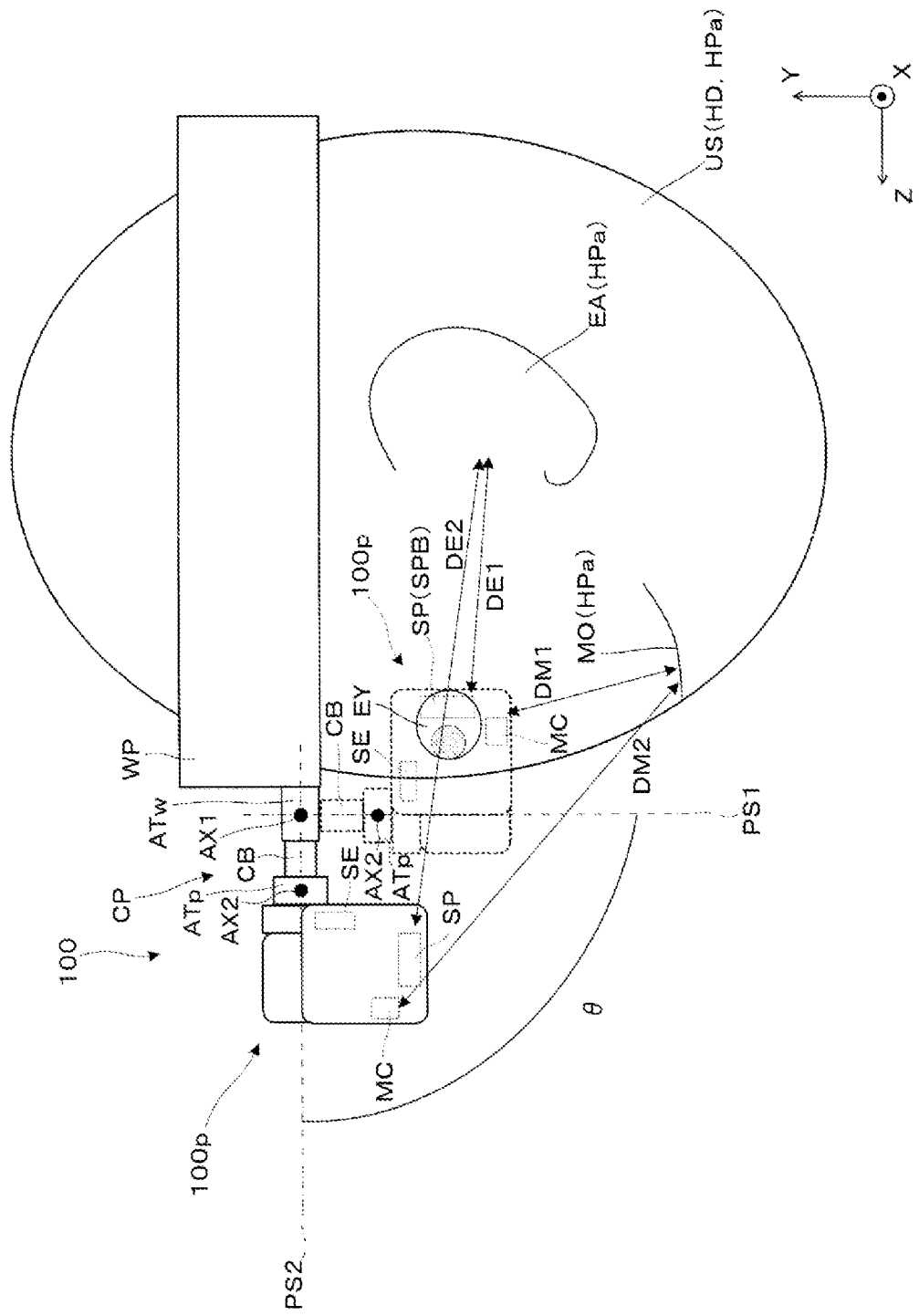
FIG. 3 is a conceptual side view for illustrating a change in position (change in posture) caused by the flip-up of a main body portion and detection thereof.

FIG. 1 is a conceptual view illustrating a head-mounted image display device 100 as an example of a wearable image display device. Of the image display device 100, FIG. 1 illustrates parts such as a wearing member WP, which is a wearing (contact) location on the head HD of a user US, and a main body portion 100p that display images. In FIG. 1, the region AR1 conceptually illustrates a front view of the image display device 100, and the region AR2 conceptually illustrates a side view of the image display device 100. The figure also illustrates an example of a manner in which the image display device 100 is worn on the head HD of the user (or a customer, an observer, or a wearer) US of the image display device 100. FIG. 2 is a view illustrating a manner of changes in position (changes in posture) of the main body portion 100p relative to the wearing member WP. FIG. 3 is also a conceptual side view illustrating a change in position (change in posture) caused by the flip-up of the main body portion 100p and the detection thereof.

As illustrated in FIG. 1 and the like, the image display device 100 is an eyeglasses-type head-mounted display (HMD), and is a virtual display device capable of enabling the user US wearing the same to recognize video as a virtual image. The image display device 100 is also capable of allowing video to be recognized as a virtual image, and allowing an outside image to be visually recognized or observed in a see-through manner. In FIG. 1 and the like, X, Y, and Z are an orthogonal coordinate system. The +X direction corresponds to the transverse direction in which both eyes of the user US wearing the image display device 100 are aligned. The +Y direction corresponds to the upward direction orthogonal to the transverse direction in which both eyes of the user US are aligned. The +Z direction corresponds to the forward direction or the frontal direction for the user US. The ±Y direction is parallel to the vertical axis or the vertical direction. As will be described later in detail, the main body portion 100p can also be flipped up in the image display device 100, as illustrated in FIGS. 2 and 3, for example. This enables the user US not only to visually recognize an outside image through a display image by the main body portion 100p, but also to visually recognize only the outside image by flipping up the main body portion 100p to retract the display image from the field of view.

As described previously, the image display device 100 includes the wearing member WP worn on the head HD of the user US, and the main body portion 100p that has an eyeglasses-like form and that displays images, as well as a frame member FR that supports the main body portion 100p as a supporting member 101, and a coupling member CP that couples the supporting member 101 to the wearing member WP in a rotatable manner, that is, so that the main body portion 100*p* can be flipped up. In addition to these, the image display device 100 includes a control device CR that controls the display operation, and a cable (coupling part) 40 that couples the control device CR to the main body portion 100*p*. Further, in addition to the above, to capture the change of the main body portion 100*p* of which the position (posture) is changed with the rotation of the supporting member 101, the image display device 100 according to the present embodiment is provided with a sensor SE.

As illustrated, the wearing member WP is a member worn on the head HD of the user US, and is a member that determines the position of the user US (or the head HD of the user US) relative to the image display device 100. In other words, considered from a different angle, it can be said that the position of the head HD of the user US expected in the image display device 100 is determined by the shape and the like of the wearing member WP. Therefore, the expected position in which the head HD is present at the time of actual use is referred to as the expected head position HPa. Note that the position of the head HD in figures corresponds to a specific example of the expected head position HPa. Note that the shape and the like of the wearing member WP are not limited to the band shape as in the illustrated example, and various aspects are conceivable. For example, an aspect can be adopted in which the wearing member WP is in a helmet shape and the user US wears the wearing member WP to use the same.

From a functional point of view, the main body portion 100*p* includes a first display part 100A for the right eye and a second display part 100B for the left eye that output video to the user US. The first display part 100A includes, for example, an image forming body part 105A and a light-guiding device 20A. Of these, the image forming body part 105A includes a display element that includes various panels or the like to form imaging light, and a projection lens or the like that projects the imaging light. The image forming body part 105A is housed inside a housing CSA. The light-guiding device 20A includes, for example, a prism member or the like. The light-guiding device 20A guides the imaging light from the image forming body part 105A as a virtual image to the right eye of the user US. Similarly, the second display part 100B includes an image forming body part 105B housed inside a housing CSB, and a light-guiding device 20B that guides the imaging light from the image forming body part 105B as a virtual image to the left eye of the user US. In the illustrated example, the light-guiding device 20A and the light-guiding device 20B are separate. However, the present disclosure is not limited to this configuration, and an integrated configuration may be adopted in which the light-guiding device 20A and the light-guiding device 20B are coupled to each other at a central portion.

From a functional point of view, the main body portion 100*p* further includes, in another configuration, a speaker SP, which is a sound output device that outputs sound to the user US, and a microphone MC, which is a sound input device into which sound from the user US is input. The speaker SP includes a first speaker SPA for the right ear and a second speaker SPB for the left ear. In the illustrated example, the first speaker SPA is housed in the housing CSA, and the second speaker SPB is housed in the housing CSB. The microphone MC is also housed in the housing CSB. As a sound output device, the speaker SP outputs, for example, the sound necessary to accompany the image display together with the image, and also outputs sound at the time of telephone calls with external devices. The microphone MC as a sound input device also collects sound at the time of the telephone calls described above. In this way, the user US of the image display device 100 can communicate with the outside, receive instructions from a remote location, and perform various tasks while viewing the image display, for example. Note that the output volume of the speaker SP and the sound collection sensitivity in the microphone MC are adjusted by the control device CR that controls the operation of each part.

In the illustrated example, both the first speaker SPA and the second speaker SPB are also disposed on the −Z side (side closer to the user US) in the housings CSA and CSB in which the first speaker SPA and the second speaker SPB are housed. In other words, in a state in which the display image (video) by the main body portion 100*p* is visually recognizable, the first speaker SPA and the second speaker SPB are disposed in a position in which sound is easily heard by the user US.

The control device CR includes a central processing unit (CPU) that performs various computational processing, a storage device (storage part), an input device, and the like. The control device CR is coupled to the main body portion 100*p* via a cable (coupling part) 40. The control device CR includes a touch panel portion, a button portion, or the like as an input device, and also functions as a controller for accepting instructions for various operations from the user US. By performing various computational processing, the control device CR transmits various signals such as video signals and sound signals for projecting desired video in the image display device 100 to the main body portion 100*p*, and controls these operations. To put it differently, each part of the main body portion 100*p* can be said to function as an output device that performs display operations or sound output operations in accordance with instructions from the control device CR. It is conceivable that the control device CR is constituted by various items, including being constituted by a dedicated controller device. In addition, it is conceivable that an aspect is adopted in which the various operations described above can be performed by installing an app (application software) in a smartphone, for example. Note that to accept instructions for various operations by the user US, the control device CR is provided with an operation part 130 as the above-described input device.

As described above, the cable (coupling part) 40 is a member that couples the main body portion 100*p* and the control device CR to each other. In the illustrated example, in the main body portion 100*p*, the cable (coupling part) 40 is coupled from the housing CSB to each internal part. Note that for the coupling to each part housed on the housing CSA side, it is conceivable, for example, that a cable is installed inside the frame member FR as the supporting member 101, or the like. The cable 40 includes a Type-C connector or the like. The cable 40 is couplable to a control device CR constituted by various items described above such as a smartphone. Note that for the material constituting the cable 40, a metal cable, an optical fiber, and the like can be employed. Furthermore, the present disclosure is not limited to the illustrated example, and a configuration may be adopted in which the cable 40 is split partway through the cable 40 and is lead to both housings CSA and CSB disposed on the right and on the left, for example, Further, in the illustrated example, the cable 40 is coupled from the housing CSB to each internal part. However, the present disclosure is not limited thereto, and a configuration can be adopted in which the cable 40 is coupled from the housing CSA to each internal part.

Note that in the above-described example, the main body portion 100*p* and the control device CR are configured with a wired connection, with the cable 40 provided as illustrated. However, a wireless connection may be adopted, with a communication part or the like with the power supply part or the control device CR being provided in the main body portion 100*p*, and a communication part or the like with the main body portion 100*p* in addition to the power supply part being provided in the control device CR as well, for example.

The supporting member 101 includes a frame member FR made of a metal or resin, for example. The housings CSA and CSB are incidentally assembled to the right and left of the frame member FR. In this way, the supporting member 101 is assembled with and supports the display devices 100A and 100B. Further, in the above-described aspect, the supporting member 101 is also assembled with and supports the speaker SP, which is a sound output device, or the microphone MC, which is a sound input device. As described above, the supporting member 101 supports the main body portion 100*p* in which the display devices 100A and 100B, the speaker SP, and the microphone MC are integrally incorporated while maintaining or fixing the relative disposition of each part.

The coupling member CP includes a rod-shaped member CB that couples an attachment member (first attachment part) ATw on the wearing member side, and an attachment member (second attachment part) ATp on the main body portion 100*p* side, that is, on the supporting member 101 side. One end of the rod-shaped member CB is attached to the attachment member ATw so as to be rotatable about the +X direction, that is, the direction from the first display part 100A toward the second display part 100B as the center axis. The other end of the rod-shaped member CB is attached to the attachment member ATp so as to be rotatable about the +X direction, that is, the direction from the first display part 100A toward the second display part 100B as the center axis. Here, as illustrated, an axis that serves as the center of rotation of the attachment member ATw is referred to as the first rotation axis AX1, and an axis that serves as the center of rotation of the attachment member ATp is referred to as the second rotation axis AX2. In other words, the coupling member CP includes the attachment member (first attachment part) ATw that is provided at an end portion in contact with the wearing member WP and that axially rotates about the first rotation axis AX1, and the attachment member (second attachment part) ATp that is provided at an end in contact with the supporting member 101 and that axially rotates about the second rotation axis AX2. In the above case, as illustrated in FIG. 2 or 3, for example, the coupling member CP consequently functions as a member for coupling the supporting member 101 to the wearing member WP while axially rotating the supporting member 101 about the rotation axis directions of the first rotation axis AX1 and the second rotation axis AX2 that extend in the X direction. Furthermore, in figures, the above-described rotation axis directions (X direction) of the coupling member CP are directions parallel to the normal line of a virtual plane including the direction in which the display device 100B (main body portion 100*p*), the supporting member 101, and the wearing member WP are aligned, that is, the YZ plane.

For example, in FIG. 2, of the regions BR1 to BR4, it is possible to switch between a position enabling the user US to visually recognize the video by the main body portion 100*p* (the first display part 100A and the second display part 100B) as illustrated in the region BR1 for example, and a position different from the position illustrated in the region BR1 as in the example illustrated in the region BR2. Note that in the example illustrated in the region BR2, the position (posture) of the supporting member 101 (frame member FR) and, by extension, the main body portion 100*p* is changed by performing a rotation about the first rotation axis AX1 from the state illustrated in the region BR1. In addition, for example, the position (posture) can be changed by performing a rotation about the second rotation axis AX2 as in the example illustrated in the region BR3, and the position (position) can also be changed by performing rotations about both the first rotation axis AX1 and the second rotation axis AX2 as in the example illustrated in the region BR4. For example, a configuration may be adopted in which a rotation (rotational movement) by 90° is possible about the first rotation axis AX1 and the second rotation axis AX2, respectively, and thus a rotation (rotational movement) by a total of 180° is possible in two stages. Furthermore, for the above-described rotation (rotational movement), a groove may be present at certain angular intervals to allow switching between them, or no grooves may be present so that the angle may be freely changed.

As described above, the supporting member 101 (frame member FR) to which the main body portion 100*p* is attached changes its posture to various angles by axial rotation of the coupling member CP about the above-described rotation axis directions (X direction).

Here, referring back to FIG. 1, in addition to those described above, the image display device 100 is provided with a sensor SE. In the illustrated example, the sensor SE is housed in the housing CSB of the main body portion 100*p*. At the time of action of the above-described rotation by the coupling member CP, the position (posture) of the sensor SE is changed, that is, displaced together with that of the main body portion 100*p*. The sensor SE includes various sensors such as a three-axis acceleration sensor, for example. The sensor SE detects the position of the supporting member 101 and, by extension, the main body portion 100*p* by capturing the change in position (posture) described above of the main body portion 100*p*. Furthermore, the sensor SE is coupled to the control device CR. The sensor SE outputs detection values related to the position detection described above to the control device CR, and analysis processing is performed at the control device CR as necessary, whereby the posture of the supporting member 101 or the main body portion 100*p* is detected. Note that a detailed example of the configuration of the sensor SE will be described later with reference to the block diagram of FIG. 4.

Hereinafter, with reference to the conceptual side view of the image display device 100 illustrated as FIG. 3, changes in position (changes in posture) caused by the flip-up of the main body portion 100*p* and detection thereof will be described.

Here, in the figure, regarding the position (posture) of the main body portion 100*p* and the change thereof, the position of the main body portion 100*p* when in the state indicated by the dashed line (corresponding to the case illustrated in the region BR1 of FIG. 2) is referred to as the first position PS1, and the position of the main body portion 100*p* when in the state indicated by the solid line (corresponding to the case illustrated in the region BR2 of FIG. 2), which is a position different from the first position PS1, is referred to as the second position PS2. Note that in FIG. 3, the first position PS1 and the second position PS2 are illustrated by a representative position indicated by a dot-dash line, respectively. In this case, the first position PS1 is a position closer to the expected head position HPa than the second position PS2. The case in which the main body portion 100*p* indicated by the dashed line is in the first position PS1 represents a case in which the main body portion 100*p* and the supporting member 101 are in a standard positional relationship for enabling the video to be visually recognized at the eye EY of the user US. This refers to a case in which the main body portion 100*p* is not flipped up, and the user US facing the +Z direction is in a state of being able to visually recognize the video from the main body portion 100*p*. On the other hand, the case in which the main body portion 100*p* indicated by the solid line is in the second position PS2 refers to a case in which the main body portion 100*p* is flipped up and the main body portion 100*p* and the supporting member 101 are in a state in which the user US is not able to visually recognize the video. In other words, when the first display part 100A and the second display part 100B that constitute the main body portion 100*p* are in the second position PS2, it means that the main body portion 100*p* is retracted to a position in which the user US is not able to visually recognize the video. Here, as an example, it is assumed that the main body portion 100*p* is rotationally moved by a rotation angle θ about the X direction as the axial direction, thereby changing the position (change the posture) from the first position PS1 to the second position PS2. As described previously, the coupling member CP is coupled to the wearing member WP and the supporting member 101, and has the function of moving the display devices 100A and 100B, that is, the main body portion 100*p* from the first position PS1 to the second position PS2 different from the first position PS1. Note that in the illustrated case, for example, the main body portion 100*p* is rotated about the first rotation axis AX1, and the rotation angle θ is 90°. In the present embodiment, the position (posture) of the main body portion 100*p* is changed with such rotation of the supporting member 101, and, by detecting the change in the main body portion 100*p* by the sensor SE, it is detected whether the main body portion 100*p* has been flipped up. Furthermore, in the following, the rotation angle θ is also referred to as the flip-up angle θ of the main body portion 100*p*.

Here, in the case of such a configuration as described above, a change in posture of the main body portion 100*p* causes a change in position (posture), relative to the user US, of the speaker SP as the sound output device and the microphone MC as the sound input device provided in the main body portion 100*p*, as well as of the first display part 100A and the second display part 100B. More specifically, the positions of the speaker SP and the microphone MC are farther from the expected head position HPa or the user US when the main body portion 100*p* is in the second position PS2 than when the main body portion 100*p* is in the first position PS1. Therefore, the speaker SP is brought farther from the ears EA of the user US, and the microphone MC is brought farther from the mouth MO of the user US. In other words, for the distance from the speaker SP to the ears EA, a distance DE2 when the main body portion 100*p* is in the second position PS2 is longer than a distance DE1 when the main body portion 100*p* is in the first position PS1. For the distance from the microphone MC to the mouth MO, a distance DM2 when the main body portion 100*p* is in the second position PS2 is longer than a distance DM1 when the main body portion 100*p* is in the first position PS1. Taking these matters into account, the control device CR of the present embodiment (see FIG. 1 and the like) controls the output of the speaker SP and the sound collection sensitivity of the microphone MC based on the position of the main body portion 100*p* detected by the sensor SE. In other words, when it is detected by the sensor SE that the main body portion 100*p* is located in the second position PS2, the control device CR makes the output of the sound output from the speaker SP louder and makes the sound collection sensitivity of the microphone MC higher than when the main body portion 100*p* is located in the first position PS1. Note that such adjustment of the sound collection sensitivity as described above may include the adjustment of directivity. In other words, the adjustment of the sound collection sensitivity may include changes in directivity of the microphone MC, which accompany changes in posture of the microphone MC. In this way, even when the speaker SP as the sound output device or the microphone MC as the sound input device is brought farther from the user US, the image display device 100 can prevent the sound from the speaker SP from becoming difficult to hear, and prevent sound from becoming difficult to reach the telephone call destination when a telephone call is performed via the microphone MC. Note that from the viewpoint of the distances DE1 and the like described above, it is conceivable that of the head HD, the position of the ears EA or the mouth MO in particular is regarded as the expected head position HPa.

Figure 4:
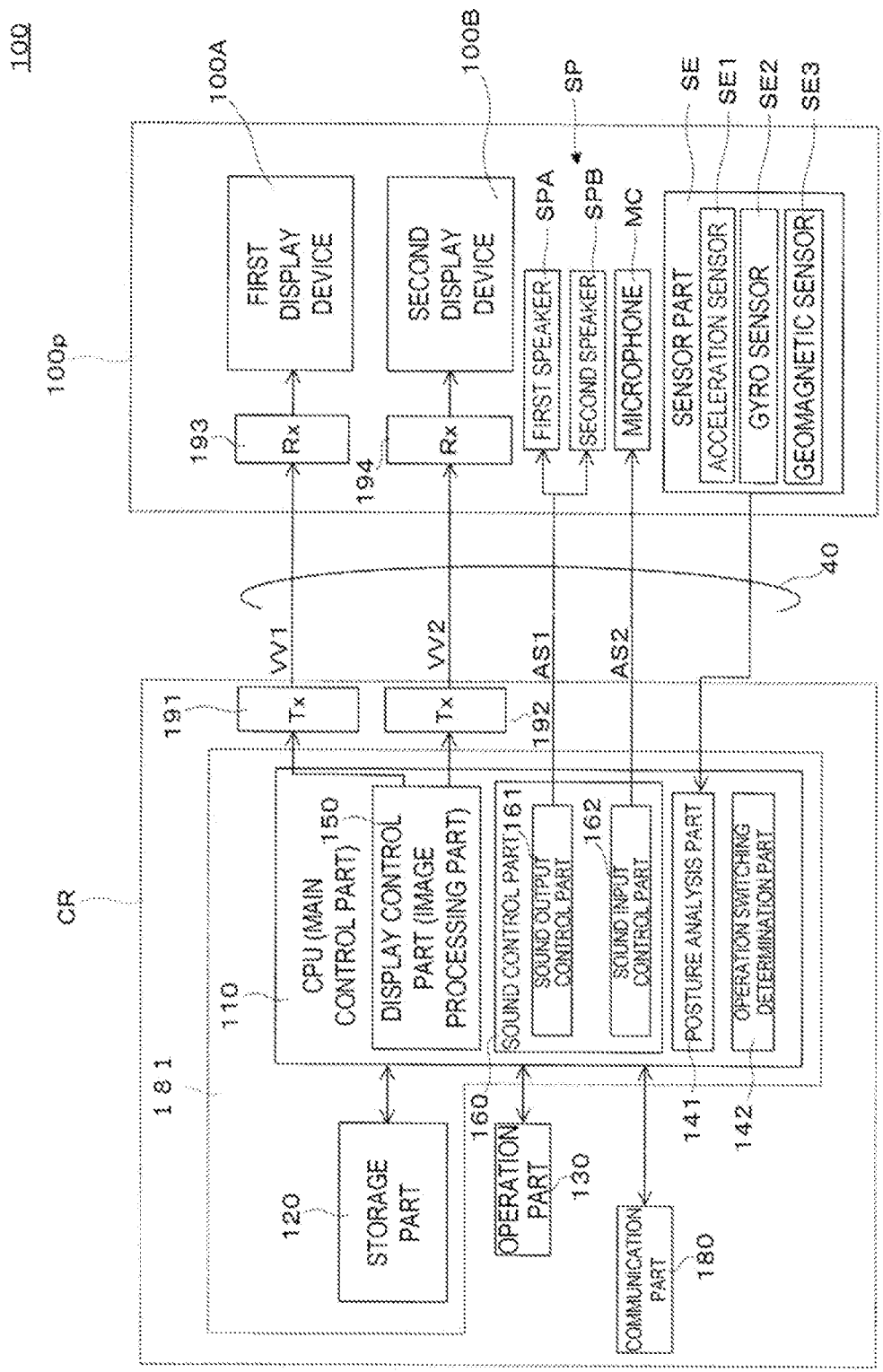
FIG. 4 is a block diagram for illustrating a configuration example of a wearable image display device.

Hereinafter, with reference to the block diagram of the image display device 100 of which an example is illustrated as FIG. 4, parts constituting the image display device 100 will be described in terms of functions.

As illustrated, of the image display device 100, the control device CR includes a CPU (main control device) 110, a storage part 120, an operation part 130, a communication part 180, and transmission parts (Tx) 191 and 192. Note that the CPU (main control device) 110 and the storage part 120 may be collectively constituted by a microcontroller unit (MCU) 181, for example.

The storage part 120 is constituted by a read-only memory (ROM), a random access memory (RAM), or the like. Various computer programs and various types of data are stored in the storage part 120.

The CPU 110 reads and executes a computer program or data from the storage part 120, thereby functioning as a display control part (image processing part) 150 or a sound control part 160. Note that here, the sound control part 160 includes a sound output control part 161 and a sound input control part 162. Further, to detect the posture of the main body portion 100*p*, the CPU 110 functions as a posture analysis part 141 that analyzes detection results of the sensor SE provided in the main body portion 100*p*, or as an operation switching determination part 142 that determines whether a switching operation is to be performed based on analysis results by the posture analysis part 141.

As described above, the CPU 110 functions as a main control device that performs various computational processing to manage the entire control of the image display device 100.

As described previously, the operation part 130 is an external input receiving device (input device) operated by the user US. The operation part 130 includes various menu keys, a track pad, or the like, and acquires signals corresponding to operation inputs by the user US.

The communication part 180 is a device for enabling communication with external devices. The communication part 180 enables communication of image information and telephone calls between the image display device 100 and the outside via an Internet connection, a dedicated line, or the like. In other words, by using the communication part 180, the user US of the image display device 100 can acquire various information for image display from the outside, engage in sound communication (bi-directional communication) with the outside using the speaker SP and the microphone MC, and conduct various tasks while receiving instructions from the outside.

The transmission parts 191 and 192 transmit various data VV1 and VV2 including video signals generated at the CPU 110 to the first display device 100A and the second display device 100B that constitute the main body portion 100p, respectively. In other words, the transmission parts 191 and 192 function as transceivers for serial transmission between the control device CR and the first display device 100A and second display device 100B.

Next, of the image display device 100, the main body portion 100p includes, as described previously, the first display part 100A and the second display part 100B, the speaker SP constituted by the first speaker SPA and the second speaker SPB, the microphone MC, and the sensor SE.

In addition to those described above, as illustrated, reception parts (Rx) 193 and 194 that function as receivers for serial transmission are provided between the control device CR and the first display part 100A and the second display part 100B. In other words, the first display part 100A receives the data VV1 transmitted from the transmission part (Tx) 191 at the reception part (Rx) 193, and performs image formation based on the image data for the right eye included in the data VV1. Furthermore, the second display part 100B receives the data VV2 transmitted from the transmission part (Tx) 192 at the reception part (Rx) 194, and performs image formation based on the image data for the left eye included in the data VV2.

The sensor SE is constituted by combining, for example, an acceleration sensor SE1, a gyro sensor (angular velocity sensor) SE2, and a geomagnetic sensor SE3, and functions as a motion sensor that detects changes in posture of the supporting member 101 and the main body portion 100p. In this way, the sensor SE detects that the display devices 100A and 100B are moved from the first position PS1 to the second position PS2. For example, when the acceleration sensor SE1 of the sensor SE is constituted by a three-axis acceleration sensor, the output of the three-axis acceleration sensor can be used to determine, for example, the posture of the user US himself or the flip-up angle θ in a state in which the change in posture of the main body portion 100p is stopped. Furthermore, when the gyro sensor SE2 of the sensor SE is constituted by a three-axis gyro sensor, the output of the three-axis gyro sensor can be used to detect, for example, the speed at which the main body portion 100p is moved with the movement of the user US. In this way, for example, in a case in which there is a possibility of erroneous determination when the acceleration sensor SE1 is used alone due to accumulation of errors such as noise errors and drift errors, any errors caused by the gyro sensor SE2 can be compensated for. Further, when detecting movement of the main body portion 100p in a structure or the like in which the main body portion 100p is transversely rotated (Y-axis rotation), for example, it is conceivable to utilize the geomagnetic sensor SE3 to capture such movement. The analysis processing for the posture detection of the supporting member 101 and the main body portion 100p is performed by the posture analysis part 141 that receives the detection results at the sensor SE. In other words, based on the information from the sensor SE, the posture analysis part 141 detects the start or end of changes in posture of the main body portion 100p and moreover calculates the value of the flip-up angle (rotation angle) θ in FIG. 3. Note that for the sensor SE, if it is possible to detect with the required precision, that is, if it is possible to appropriately calculate the value of the flip-up angle (rotation angle) θ or the like, it is not necessary to require all of the various sensors described above, and the sensor SE may be constituted by some of the various sensors described above.

In accordance with the result of the analysis performed as described above at the posture analysis part 141, the operation switching determination part 142 determines whether the main body portion 100p is located in the first position PS1 or is located in the second position PS2. Note that in this determination, a threshold value for the flip-up angle θ is pre-set, and whether the main body portion 100p is located in the first position PS1 or is located in the second position PS2 is determined based on whether the calculated value of the flip-up angle θ is greater than the threshold value at the time when the change in posture of the main body portion 100p ended.

The speaker SP (the first speaker SPA and the second speaker SPB) performs the sound output operation according to a sound signal AS1 from the sound output control part 161 of the sound control part 160. Note that the volume adjustment of the sound signal AS1 is determined in accordance with a result of the above-described determination by the operation switching determination part 142.

The microphone MC adjusts the sensitivity of sound input according to a sensitivity adjustment signal AS2 from the sound input control part 162 of the sound control part 160. Note that the sensitivity adjustment signal AS2 is determined in accordance with a result of the above-described determination by the operation switching determination part 142.

Furthermore, in addition to the above, the display operation in the first display part 100A and the second display part 100B can also be switched. In other words, image display can be continued when it is determined in the operation switching determination part 142 that the main body portion 100p is located in the first position PS1, and image display can be stopped when it is determined that the main body portion 100p is located in the second position PS2.

Hereinafter, an example of operations in the image display device 100 that has the configuration described above will be described with reference to the flowchart of FIG. 5. More specifically, an example will be described for the detection processing of a change in the flip-up angle θ in the image display device 100, and the sound control processing based on the value of the angle θ at the end of such a change.

Figure 5:
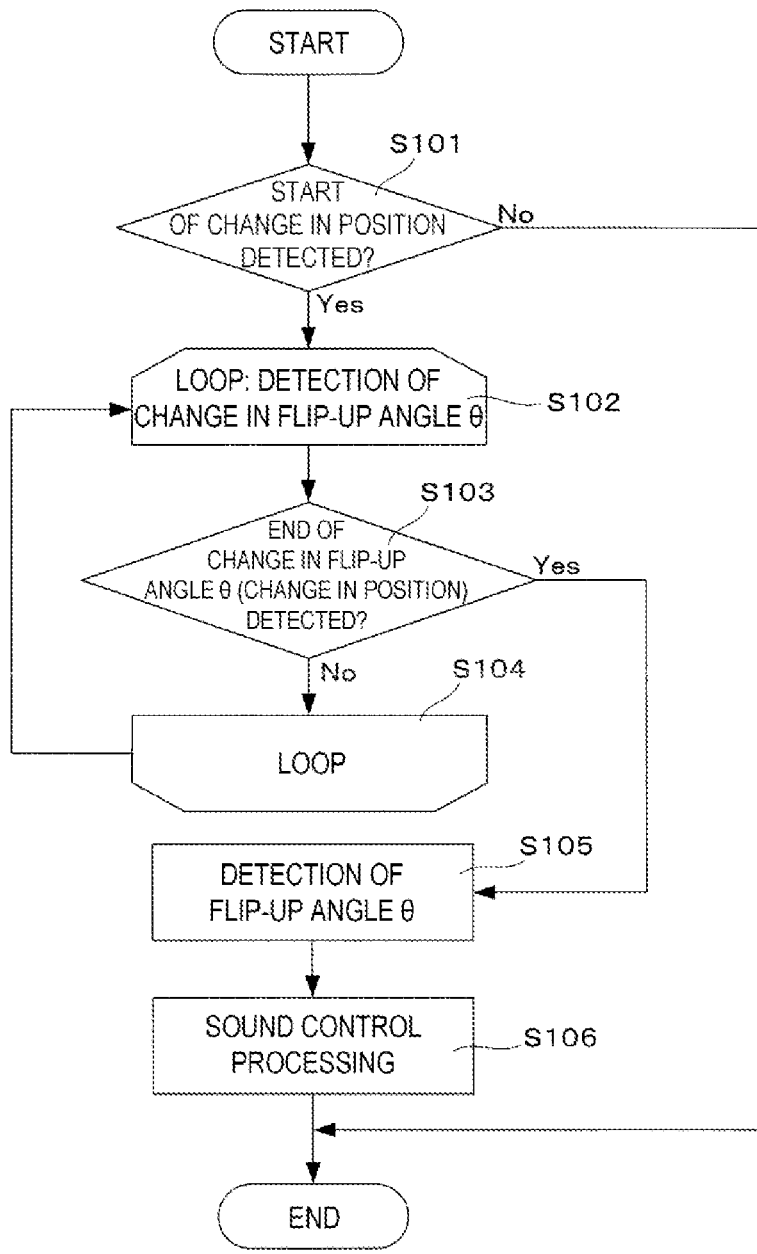
FIG. 5 is a flowchart for illustrating an example of operation of a wearable image display device.

In the flowchart of FIG. 5, first, of the image display device 100, the CPU 110, which is the main part of the control device CR, serves as the posture analysis part 141 and detects whether changes in position of the supporting member 101 and the main body portion 100p have been started based on various data from the sensor SE (step S101). In other words, for the flip-up angle θ, whether a change greater than or equal to a certain extent has occurred is detected. In step S101, when it is detected that no change in position of the main body portion 100p has been started (step S101: No), it is determined that the current state has been maintained regarding the flip-up of the main body portion 100p, and the process ends with no special processing performed.

On the other hand, when the start of a change in position of the main body portion 100p is detected in step S101 (step S101: Yes), that is, when a change in the value of the angle θ is detected by sensing at the sensor SE, the posture analysis part 141 continues the detection of the change until the change in the value of the angle θ ends (steps S102 to S104). Thereafter, when it is detected that the change in the value of the angle θ has ended, that is, that the change in position of the main body portion 100p has ended (step S103: Yes), the posture analysis part 141 detects the flip-up angle θ at the time when the change in position ended. In other words, the value of the flip-up angle θ at the time when the change in position ended is calculated (step S105), a determination is made based on the calculation result of the control device CR, and a sound control processing is performed in accordance with the determination result (step S106). In other words, from the value of the flip-up angle θ calculated in step S105, it is determined whether the main body portion 100p is located in the first position PS1 or is located in the second position PS2. Based on this determination result, the control device CR adjusts the output volume of the speaker SP, or adjusts the sound collection sensitivity of the microphone MC. Once the processing of step S106 is completed, the control device CR completes a series of operation processing.

Note that in the foregoing, in order to simplify description, the above-described determination is composed of two stages: whether the main body portion 100p is located in the first position PS1, or is located in the second position PS2. However, an aspect can also be adopted in which finer stages are set, that is, the rotation angle θ is determined in three or more stages, and accordingly the adjustment of the output volume of the speaker SP and the adjustment of the sound collection sensitivity of the microphone MC are also performed in multiple stages.

As described above, the image display device 100 as the wearable image display device according to the present embodiment includes: the wearing member WP worn on the head HD of the user US; display devices 100A and 100B configured to display video; the supporting member 101 (frame member FR) configured to support the display devices 100A and 100B; the coupling member CP that is coupled to the wearing member WP and the supporting member 101 and that is configured to move the display devices 100A and 100B from the first position PS1 in which the user US is able to visually recognize the video to the second position PS2 different from the first position PS1; the speaker SP that is a sound output device disposed at the supporting member 101; and the control device CR configured to control an output of sound output from the speaker SP; wherein the control device CR makes the sound output from the speaker SP when the display devices 100A and 100B are located in the second position PS2 louder than the sound output from the speaker SP when the display devices 100A and 100B are located in the first position PS1. In this case, when the main body portion 100p including the display devices 100A and 100B is located in the second position PS2 different from the first position PS1 in which the video is visually recognizable, the control device CR can make the output of the speaker SP louder than when the main body portion 100p is supported at the first position PS1, thereby causing sound to be easily heard even when the speaker SP is brought farther from the user US, for example.

Second Embodiment

Hereinafter, a wearable image display device according to a second embodiment will be described with reference to FIG. 6. Note that the image display device as an example of the wearable image display device according to the present embodiment is a partial modification of the image display device according to the first embodiment. For the speaker SP as the sound output device, each of the speaker for the right ear and the speaker for the left ear is constituted by a plurality of speakers. The microphone MC is also constituted by a plurality of microphones. Except for these points, the image display device according to the present embodiment is similar to that according to the first embodiment. Thus, detailed illustrations and description thereof will be omitted. As necessary, matters described with reference to other drawings will be cited.

Figure 6:
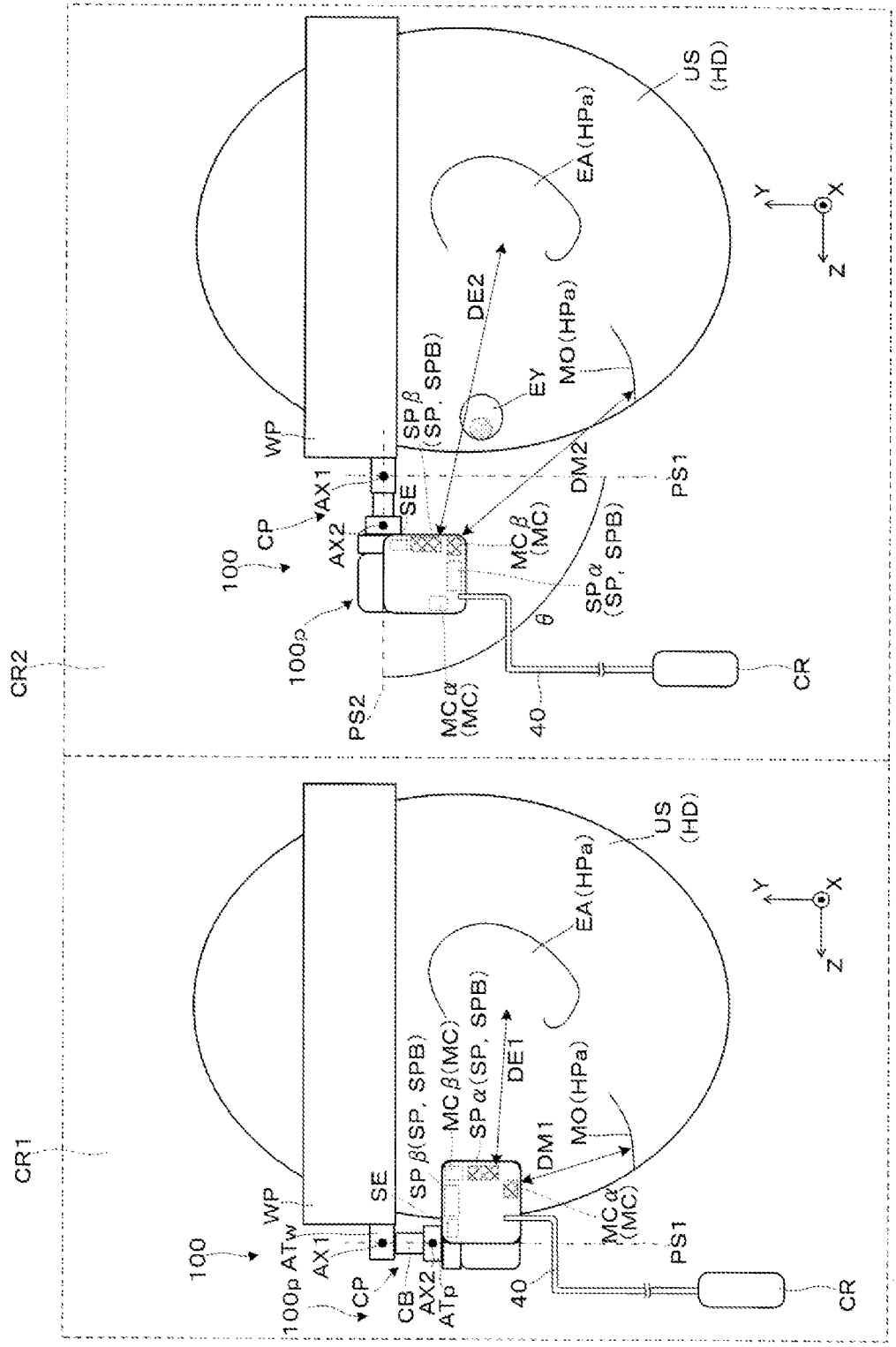
FIG. 6 is a conceptual side view for illustrating a change in position (change in posture) of a main body portion in a wearable image display device according to a second embodiment and detection thereof.

FIG. 6 is an external view illustrating the image display device 100 according to the present embodiment, and corresponds to FIG. 1 or 3. In FIG. 6, the region CR1 illustrates an example of the image display device 100 when the main body portion 100p is in the first position PS1, and the region CR2 illustrates an example of the image display device 100 when the main body portion 100p is in the second position PS2.

As illustrated in the region CR1 or the region CR2, the speaker SP as the sound output device includes, as the second speaker SPB for the left ear, a first position speaker SPα, which is a first sound output device, and a second position speaker SPβ, which is a second sound output device. Note that although illustrations and description are omitted, the first speaker SPA for the right ear (see FIG. 1 and the like) also similarly includes a first position speaker SPα and a second position speaker SPβ. Further, the microphone MC includes a first position microphone MCα, which is a first sound input device, and a second position microphone MCβ, which is a second sound input device.

Here, as illustrated as distances DE1, DE2, DM1, and DM2 in figures, to the position of the ears EA or the mouth MO of the head HD, that is, to the expected head position HPa determined by the wearing member WP, the first position speaker SPα is closer than the second position speaker SPβ when the main body portion 100p is in the first position PS1, and the second position speaker SPβ is closer than the first position speaker SPα when the main body portion 100p is in the second position PS2.

In the above case, as illustrated by hatching in figures, when the main body portion 100p is in the first position PS1 as illustrated in the region CR1, the first position speaker SPα and the first position microphone MCα are in operation, while the operation of the second position speaker SPβ and the second position microphone MCβ is paused. On the other hand, when the main body portion 100p is in the second position PS2 as illustrated in the region CR2, conversely, the second position speaker SPβ and the second position microphone MCβ are in operation, while the operation of the first position speaker SPα and the first position microphone MCα is paused. In this way, even when the speaker SP as the sound output device or the microphone MC as the sound input device is brought farther from the user US, it is possible to prevent sound from becoming difficult to hear, or prevent sound from becoming difficult to reach the telephone call destination (prevent the sound collection conditions from deteriorating) when a telephone call is performed via the microphone MC, for example.

To perform such operation control as described above, based on detection results at the sensor SE, the control device CR outputs sound from the first position speaker SPα and collects sound by the first position microphone MCα when the main body portion 100p is in the first position PS1, and the control device CR outputs sound from the second position speaker SPβ and collects sound by the second position microphone MCβ when the main body portion 100p is in the second position PS2.

As described above, the image display device 100 as the wearable image display device according to the present embodiment includes: the wearing member WP worn on the head HD of the user US; display devices 100A and 100B configured to display video; the supporting member 101 (frame member FR) configured to support the display devices 100A and 100B; the coupling member CP that is coupled to the wearing member WP and the supporting member 101 and that is configured to move the display devices 100A and 100B from the first position PS1 in which the user US is able to visually recognize the video to the second position PS2 different from the first position PS1; the speaker SP that is a sound output device disposed at the supporting member 101; and the control device CR configured to control an output of sound output from the speaker SP; wherein the speaker SP includes the first position speaker SPα, which is the first sound output device, and the second position speaker SPβ, which is the second sound output device, and the control device CR causes sound to be output from the first position speaker SPα when the display devices 100A and 100B are located in the first position PS1, and causes sound to be output from the second position speaker SPβ when the display devices 100A and 100B are located in the second position PS2.

In the present embodiment, the control device CR can perform operation switching among a plurality of speakers that constitute the speaker SP so that sound is easily heard. Note that in the present embodiment as well, in order to simplify description, the determination about the above-described operation switching is composed of two stages: whether the main body portion 100p is located in the first position PS1, or is located in the second position PS2. However, an aspect can also be adopted in which finer stages are set, that is, determination is performed in three or more stages, and accordingly the volume adjustment and the sensitivity adjustment are also performed in multiple stages.

Modified Examples and Others

The present disclosure has been described according to the above-described embodiments. However, the present disclosure is not limited to the above-described embodiments, and can be carried out in various aspects without departing from the gist of the present disclosure. For example, the following modifications can also be carried out.

In the above description, the image display device 100 has a see-through configuration that allows video as a virtual image to be recognized, and an outside image to be visually recognized or observed. However, the image display device 100 can also be applied in a configuration that does not involve visual recognition of the outside image (a so-called closed configuration).

Furthermore, in the above description, for the detection device that detects the posture of the main body portion 100p, it is possible to regard only the sensor SE as the detection device, and it is also possible to regard the posture analysis part 141 in addition to the sensor SE as the detection device. It is also conceivable to adopt a configuration in which the analysis function corresponding to that of the posture analysis part 141 is provided on the sensor SE side, and analysis results are transmitted to the control device CR side.

Figure 7:
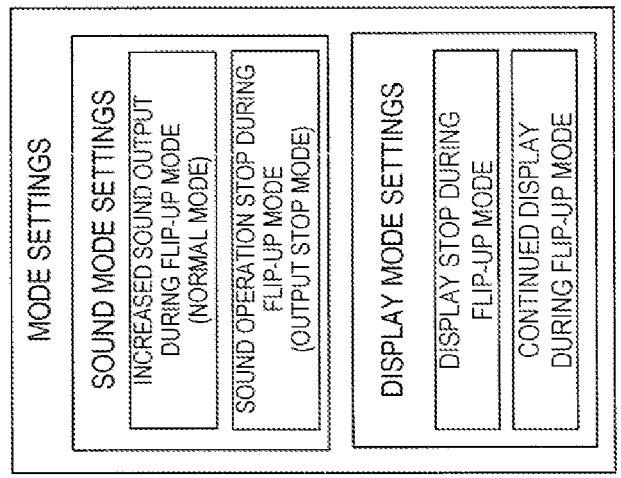
FIG. 7 is a conceptual view for illustrating an example of mode settings.

Furthermore, in the above description, an example of a threshold value for the range (effective range) of the rotation angle θ is set to 90°. However, the present disclosure is not limited thereto, and various ranges can be set in accordance with use modes of the device. For example, the range of the rotation angle θ may be set in accordance with the operation by the user US. Further, at the time of rotations about the first rotation axis AX1 and the second rotation axis AX2, for example, the control mode of the control device CR may be changed in accordance with the rotation axis used. More specifically, in a case in which a rotation (rotational movement) by up to 90° is possible about both the first rotation axis AX1 and the second rotation axis AX2, when rotations (rotational movements) about both rotation axes are performed and the rotation angle θ is greater than 90°, the operation of the speaker SP may be stopped. Further, the user may be able to pre-set or select these settings. In other words, as illustrated in FIG. 7, for example, the operation part 130 may allow the user US to select various mode settings for the operation mode. Specifically, for example, for various settings related to sound (sound mode settings), as described above as the first embodiment, selection of any of the following modes may be enabled: a first mode, which is a normal mode in which the output of the speaker SP is made louder when the main body portion 100p is located in the second position PS2 (increased sound output during flip-up mode); and a second mode, which is an operation stop mode in which the operation of the speaker SP is stopped when the main body portion 100p is located in the second position PS2 (output stop mode). Furthermore, for example, for various settings related to image display (display mode settings), selection of any of the following modes may be enabled: a display stop during flip-up mode in which the image display by the first display part 100A and the second display part 100B is stopped when the main body portion 100p is located in the second position PS2 (that is, when the main body portion 100p is retracted by the flip-up to a position in which video is not visually recognizable); and a continued display during flip-up mode in which the image display is continued even when the main body portion 100p is located in the second position PS2.

Furthermore, in the above description, the sensor SE includes an acceleration sensor or the like, but the present disclosure is not limited thereto. For example, it is conceivable that a rotary encoder is provided to detect the rotation angles of the coupling member CP about the first rotation axis AX1 and the second rotation axis AX2, and the rotation angle θ is calculated from the detection results by the rotary encoder.

Furthermore, in the above description, for the operation of the speaker SP and the microphone MC, the operation mode is similarly changed with a change in posture of the main body portion 100p. However, the present disclosure is not limited thereto. For example, the operation mode of only one of the speaker SP and the microphone MC may be changed with a change in posture of the main body portion 100p. Alternatively, the operation modes of the speaker SP and the microphone MC may be different from each other. For example, when the main body portion 100p is located in the second position PS2, the speaker SP may be set to the normal mode in which the output is made louder, and the microphone MC may be set to the operation stop mode in which the operation is stopped, so that an unidirectional telephone call from the outside can be made.

Furthermore, in the above description, a flip-up image display device 100 is used. However, it is also conceivable to adopt a configuration in which a sliding mechanism is provided to displace the main body portion 100p, for example. For example, it is conceivable to adopt a structure in which the main body portion 100p is shifted in the transverse direction (is slid in the X direction or the Y direction). In this case, such sliding movement may be detected by the geomagnetic sensor SE3 or the like provided as the sensor SE.

Note that in the above description, the image display device 100 is for both eyes. However, for the image display device 100, one of the portion for the right eye and the portion for the left eye can be omitted. In this case, a single-eye head-mounted display is obtained.

A first wearable image display device according to a specific aspect includes: a wearing member worn on a head of a user; a display device configured to display video; a supporting member configured to support the display device; a coupling member that is coupled to the wearing member and the supporting member and that is configured to move the display device from a first position in which the user is able to visually recognize the video to a second position different from the first position; a sound output device disposed at the supporting member; and a control device configured to control an output of sound output from the sound output device; wherein the control device makes the sound output from the sound output device when the display device is located in the second position louder than the sound output from the sound output device when the display device is located in the first position.

In the above-described wearable image display device, when the display device is located in the second position different from the first position in which the display device enables the video to be visually recognized, the control device makes the output of the sound output device louder than when the display device is located in the first position. This makes it possible to prevent sound from becoming difficult to hear even when the sound output device is brought farther from the user. In other words, even when the sound device (sound output device) that accompanies the display device is moved, the sound operation can be favorably maintained.

In a specific aspect, the display device further includes a sensor configured to detect that the display device is moved from the first position to the second position, wherein the control device detects that the display device is in the second position based on the detection result from the sensor. In this case, the position of the display device is detected by the sensor.

In a specific aspect, the first position is closer to an expected head position determined by the wearing member than the second position. In this case, when the display device is at the second position farther from the expected head position than the first position, the output of the sound output device is made louder to prevent sound from becoming difficult to hear.

In a specific aspect, the display device includes a first display part and a second display part, and the coupling member changes the posture of the display device relative to the wearing member, with a direction parallel to the direction from the first display part toward the second display part as a rotation axis. In this case, with the axial rotation of the coupling member, the posture of the display device relative to the wearing member is changed about a direction parallel to the direction from the first display part toward the second display part.

In a specific aspect, the coupling member includes a first attachment part that is provided at an end in contact with the wearing member and that axially rotates about a direction parallel to a rotation axis, and a second attachment part that is provided at an end portion in contact with the supporting member and that axially rotates about a direction parallel to a rotation axis. In this case, axial rotation in two stages is possible at the first attachment part and the second attachment part.

In a specific aspect, the second position is a position in which the user is not able to visually recognize the video from the display device, and the control device stops operation of the display device when the display device is located in the second position. In this case, power saving can be achieved by stopping the display operation when the display device is retracted to a position in which the video is not visually recognizable.

In a particular aspect, the control device selects one of a first mode in which the output of the sound output from the sound output device when the display device is located in the second position is made louder than the output of the sound output from the sound output device when the display device is located in the first position, and a second mode in which the output of the sound output from the sound output device is stopped when the display device is in the second position. In this case, output modes related to sound (output modes) can be selected in accordance with the needs of the user.

In a specific aspect, the supporting member includes a sound input device into which sound from the user is input, and the control device makes the sound collection sensitivity of the sound input device when the display device is located in the second position higher than the sound collection sensitivity of the sound input device when the display device is located in the first position. In this case, it is possible to avoid or suppress deterioration in the sound collection conditions that accompany changes in posture.

A second wearable image display device according to a specific aspect includes: a wearing member worn on a head of a user; a display device configured to display video; a supporting member configured to support the display device; a coupling member that is coupled to the wearing member and the supporting member and that is configured to move the display device from a first position in which the user is able to visually recognize the video to a second position different from the first position; a sound output device disposed at the supporting member; and a control device configured to control an output of sound output from the sound output device; wherein the sound output device includes a first sound output device and a second sound output device, and the control device outputs sound from the first sound output device when the display device is located in the first position, and outputs sound from the second sound output device when the display device is located in the second position.

In the above-described wearable image display device, the control device causes sound to be output from the first sound output device when the display device is located in the first position, and causes sound to be output from the second sound output device when the display device is located in the second position. This makes it possible to prevent sound from becoming difficult to hear both when the display device is located in the first position and when the display device is located in the second position.

In a specific aspect, to an expected head position determined by the wearing member, the first sound output device is closer than the second sound output device when the display device is located in the first position, and the second sound output device is closer than the first sound output device when the display device is located in the second position. In this case, it is possible to prevent the sound output device from being brought farther from the user.

What is claimed is:
1. A wearable image display device comprising:
a wearing member worn on a head of a user;
a display device configured to display video;

a supporting member configured to support the display device;

a coupling member that is coupled to the wearing member and the supporting member and that is configured to move both of the display device and the supporting member from a first position to a second position different from the first position, wherein the first position is a position in which the user is able to visually recognize the video;

a sound output device disposed at an outer surface of the supporting member; and a control device configured to control an output of sound output from the sound output device, wherein the control device executes a first mode in which the sound output from the sound output device when the display device is located in the second position is made louder than the sound output from the sound output device when the display device is located in the first position, wherein the coupling member includes:

a first attachment part provided at an end portion in contact with the wearing member and having a first rotation axis; and a second attachment part provided at an end portion in contact with the supporting member and having a second rotation axis, wherein the display device is configured to rotate about the first rotation axis and the second rotation axis, wherein the sound output device includes a first sound output device and a second sound output device, the first sound output device is closer to an expected head position determined by the wearing member than the second sound output device when the display device is located in the first position, and the second sound output device is closer to the expected head position than the first sound output device when the display device is located in the second position.

2. The wearable image display device according to claim 1, comprising:

a sensor configured to detect that the display device is moved from the first position to the second position, wherein the control device detects, based on a detection result from the sensor, that the display device is located in the second position.

3. The wearable image display device according to claim 1, wherein the first position is closer to the expected head position determined by the wearing member than the second position.

4. The wearable image display device according to claim 1, wherein the display device includes a first display part and a second display part, and the coupling member changes a position of the display device relative to the wearing member, with a first direction from the first display part toward the second display part as a rotation axis.

5. The wearable image display device according to claim 1, wherein the second position is a position not enabling the user to visually recognize the video from the display device, and the control device stops operation of the display device when the display device is located in the second position.

6. The wearable image display device according to claim 1, wherein the control device executes any of the first mode and a second mode configured to stop the output of the sound output from the sound output device when the display device is in the second position.

7. The wearable image display device according to claim 1, wherein the supporting member includes a sound input device into which sound from the user is input, and the control device makes a sound collection sensitivity of the sound input device when the display device is located in the second position higher than a sound collection sensitivity of the sound input device when the display device is located in the first position.

8. A wearable image display device comprising:

a wearing member worn on a head of a user;

a display device configured to display video;

a supporting member configured to support the display device;

a coupling member that is coupled to the wearing member and the supporting member and that is configured to move both of the display device and the supporting member from a first position to a second position different from the first position, wherein the first position is a position in which the user is able to visually recognize the video;

a sound output device disposed at an outer surface of the supporting member; and a control device configured to control an output of sound output from the sound output device, wherein the sound output device includes a first sound output device and a second sound output device, the control device causes the sound to be output only from the first sound output device when the display device is located in the first position, and causes the sound to be output only from the second sound output device when the display device is located in the second position, the first sound output device is closer to an expected head position determined by the wearing member than the second sound output device when the display device is located in the first position, and the second sound output device is closer to the expected head position than the first sound output device when the display device is located in the second position.

* * * * *